(12) United States Patent
Mai

(10) Patent No.: US 12,427,795 B2
(45) Date of Patent: Sep. 30, 2025

(54) IMAGE FORMING APPARATUS

(71) Applicant: KYOCERA Document Solutions Inc., Osaka (JP)

(72) Inventor: Nam Van Mai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 147 days.

(21) Appl. No.: 18/495,713

(22) Filed: Oct. 26, 2023

(65) Prior Publication Data
US 2024/0149596 A1    May 9, 2024

(30) Foreign Application Priority Data
Oct. 28, 2022   (JP) ................................ 2022-173209

(51) Int. Cl.
    *B41J 15/04*   (2006.01)
    *B65H 1/26*    (2006.01)
    *H04N 1/00*    (2006.01)

(52) U.S. Cl.
    CPC ............ *B41J 15/044* (2013.01); *B65H 1/266* (2013.01); *H04N 1/00037* (2013.01); *H04N 1/00538* (2013.01); *H04N 1/00557* (2013.01); *H04N 1/00559* (2013.01)

(58) Field of Classification Search
    CPC .................................................. B41J 13/103
    See application file for complete search history.

(56) References Cited

U.S. PATENT DOCUMENTS

| | | | | |
|---|---|---|---|---|
| 4,861,017 A | * | 8/1989 | Yamamoto | G03G 15/6502 271/145 |
| 9,663,311 B2 | | 5/2017 | Tanio | |
| 2007/0013121 A1 | * | 1/2007 | Kang | B65H 1/08 271/145 |
| 2010/0044956 A1 | * | 2/2010 | Ko | B65H 1/12 271/162 |
| 2013/0009359 A1 | * | 1/2013 | Yamada | B65H 5/26 271/264 |
| 2013/0032996 A1 | * | 2/2013 | Kubota | B65H 1/266 271/145 |

(Continued)

FOREIGN PATENT DOCUMENTS

JP    2010222078 A  * 10/2010
JP    2016101994 A    6/2016

*Primary Examiner* — Shelby L Fidler
(74) *Attorney, Agent, or Firm* — Studebaker Brackett PLLC

(57) ABSTRACT

An image forming apparatus includes a sheet feeding cassette, a cassette attachment part, and a sensor. The sensor is switched in a cassette detection state and a cassette non-detection state. The sheet feeding cassette includes a detected piece, a pressure piece, and a lock receiving part. The detected piece switches the sensor to the cassette detection state and to the cassette non-detection state. The presser piece is provided integrally with the detected piece. The lock receiving part supports the presser piece movably. The cassette attachment part includes a locking member. When the sheet feeding cassette is attached to the attachment part, the detected piece switches the sensor from the cassette non-detection state to the detection state to enable a sheet feeding operation from the sheet feeding cassette, and the pressure piece interferes with the locking member to cause the locking member to be engaged with the lock receiving part.

5 Claims, 10 Drawing Sheets

(56) References Cited

U.S. PATENT DOCUMENTS

2015/0183242 A1\* 7/2015 Shirane .................. B41J 13/103
  347/16
2016/0152428 A1 6/2016 Tanio \* cited by examiner Fr ⟷ Rr Fr ←——→ Rr

IMAGE FORMING APPARATUS

INCORPORATION BY REFERENCE

This application is based on and claims the benefit of priority from Japanese patent application No. 2022-173209 filed on Oct. 28, 2022, which is incorporated by reference in its entirety.

BACKGROUND

The present disclosure relates to an image forming apparatus including a detachable sheet feeding cassette.

An image forming apparatus such as a multifunctional peripheral and a printer includes a detachable sheet feeding cassette. When the sheet feeding cassette is attached to a cassette attachment part of the apparatus main body, a sheet feeding mechanism provided in the cassette attachment part enables the sheet to feed toward the conveyance path.

If the sheet feeding cassette is not properly attached to the cassette attachment part, the sheet feeding operation may stop or the sheet jam may occur. Therefore, the image forming apparatus may be provided with a locking mechanism to lock the sheet feeding cassette in the apparatus main body. The locking mechanism includes a locking piece rotatably provided on the support unit of the apparatus main body and a protrusion provided on the sheet feeding cassette, and as the sheet feeding cassette is attached to the apparatus main body, the protrusion is engaged with the locking piece to lock the sheet feeding cassette in the apparatus main body.

In addition, such an image forming apparatus is provided with a sensor that is switched in a cassette detection state in which the sheet feeding cassette is attached to the cassette attachment part and in a cassette non-detection state in which the sheet feeding cassette is not attached. The sensor is switched from the non-cassette detection state to the cassette detection state to start the feeding operation of the sheet from the sheet feeding cassette.

However, in the image forming apparatus described above, the sensor may be switched from the non-cassette detection state to the cassette detection state even when the locking piece and the protrusion are not securely engaged, that is, when the sheet feeding cassette is not correctly attached to the cassette attachment part. In such a state, if the sensor is switched from the non-cassette detection state to the cassette detection state to start the feeding operation of the sheet from the sheet feeding cassette, as described above, the sheet feeding may stop and the failure such as the sheet jam may occur.

SUMMARY

An image forming apparatus according to the present disclosure includes a sheet feeding cassette, a cassette attachment part, and a sensor. The sheet feeding cassette houses a sheet. To the cassette attachment part, the sheet feeding cassette is attached. The sensor is provided in the cassette attachment part and switched in a cassette detection state in which the sheet feeding cassette is attached to the cassette attachment part and a cassette non-detection state in which the sheet feeding cassette is not attached to the cassette attachment part. The sheet feeding cassette includes a detected piece, a presser piece, and a lock receiving part. The detected piece switches the sensor to the cassette detection state and to the cassette non-detection state. The presser piece is provided integrally with the detected piece. The lock receiving part supports the presser piece movably. The cassette attachment part includes a locking member which is turnably supported and is engaged with the lock receiving part when the sheet feeding cassette is attached to the attachment part. When the sheet feeding cassette is attached to the attachment part, the detected piece switches the sensor from the cassette non-detection state to the detection state to enable a sheet feeding operation from the sheet feeding cassette, and the presser piece interferes with the locking member to cause the locking member to be engaged with the lock receiving part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an image forming apparatus according to one embodiment of the present disclosure will be described.

Figure 1:
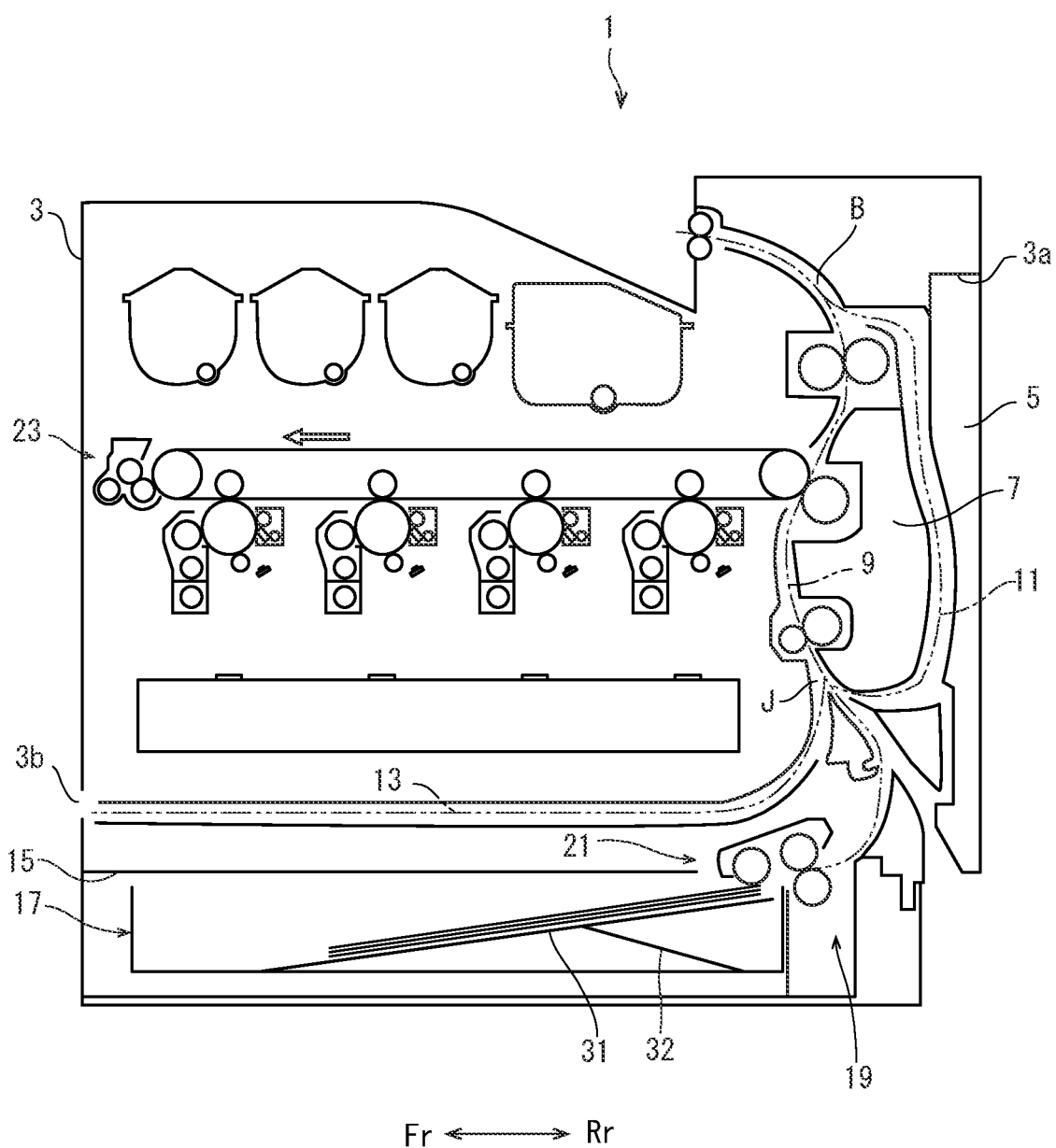
FIG. 1 is a side view schematically showing an inner structure of an image forming apparatus according to one embodiment of the present disclosure.

First, with reference to FIG. 1, an entire structure of the image forming apparatus 1 according to this embodiment will be described. FIG. 1 is a side view schematically showing the internal structure of the image forming apparatus 1. In the following description, the left side of the paper plane on which FIG. 1 is drawn is defined as the front side of the image forming apparatus 1. In each figure, Fr, Rr, L and R indicate the front, rear, left and right sides of the image forming apparatus, respectively.

The apparatus main body 3 of the image forming apparatus 1 includes a rear cover 5 which opens and closes an opening 3a provided on the rear surface and a conveying unit 7 arranged inside the rear cover 5. The rear cover 5 and the conveying unit 7 are supported by the apparatus main body 3 so as to be pivoted around their lower ends. A main conveyance path 9 extending from the lower side to the upper side is formed between the apparatus main body 3 and the conveying unit 7. An approximately C-shaped inversion conveyance path 11 in the side view is formed between the conveying unit 7 and the rear cover 5. When the rear cover 5 is turned downward, the inversion conveyance path 11 is opened, and when the conveying unit 7 is turned downward together with the rear cover 5, the main conveyance path 9 is opened.

The sheet is conveyed along the main conveyance path 9 in the conveying direction from the lower side to the upper side. The inversion conveyance path 11 is branched from the main conveyance path 9 at a downstream branch point B in the conveying direction and is merged with the main conveyance path 9 at an upstream junction point J. Furthermore, a manual sheet feeding path 13 is formed in the apparatus main body 3. The manual sheet feeding path 13 is formed almost horizontally from a manual sheet feeding port 3b formed on the front surface of the apparatus main body 3 to the junction point J, and is merged with the main conveyance path 9 at the junction point J.

The apparatus main body 3 includes a cassette housing part 15 below the manual sheet feeding path 13. The cassette housing part 15 is opened to the front surface of the apparatus main body 3. A sheet feeding cassette 17 is detachably housed in the cassette housing part 15. The cassette housing part 15 is provided with a cassette attachment part 19 to which the sheet feeding cassette 17 is attached and a sheet feeding part 21 which feeds the sheet from the sheet feeding cassette 17 attached to the cassette attachment part 19 to the main conveyance path 9. The sheet feeding cassette 17 is inserted into the cassette housing part 15 through the opening and attached to the cassette attachment part 19. The direction in which the sheet feeding cassette 17 is inserted into the cassette housing part 15 (the direction from the front side to the rear side) is defined as an attachment direction X. The sheet feeding cassette 17, the cassette housing part 19 and the sheet feeding part 21 will be described later.

The apparatus main body 3 includes an image forming part 23 above the manual sheet feeding path 13. The image forming part 23 forms an image on the sheet by, for example, an electrophotographic method. The sheet fed from the sheet feeding cassette 17 or conveyed along the manual sheet feeding path 13 is conveyed along the main conveyance path 9, and an image is formed on the sheet in the image forming part 23.

Figure 2:
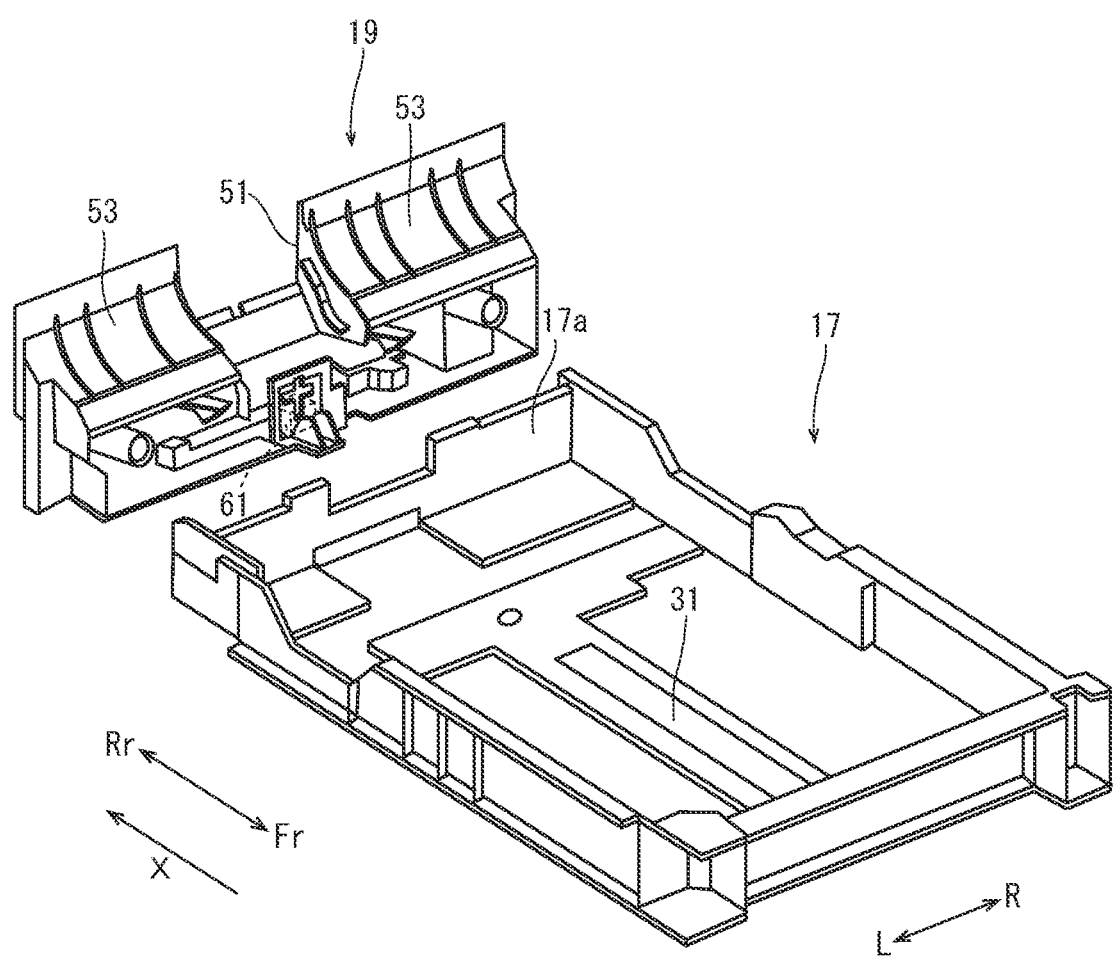
FIG. 2 is a perspective view showing a sheet feeding cassette and a cassette attachment part, in the image forming apparatus according to the embodiment of the present disclosure.
Figure 4:
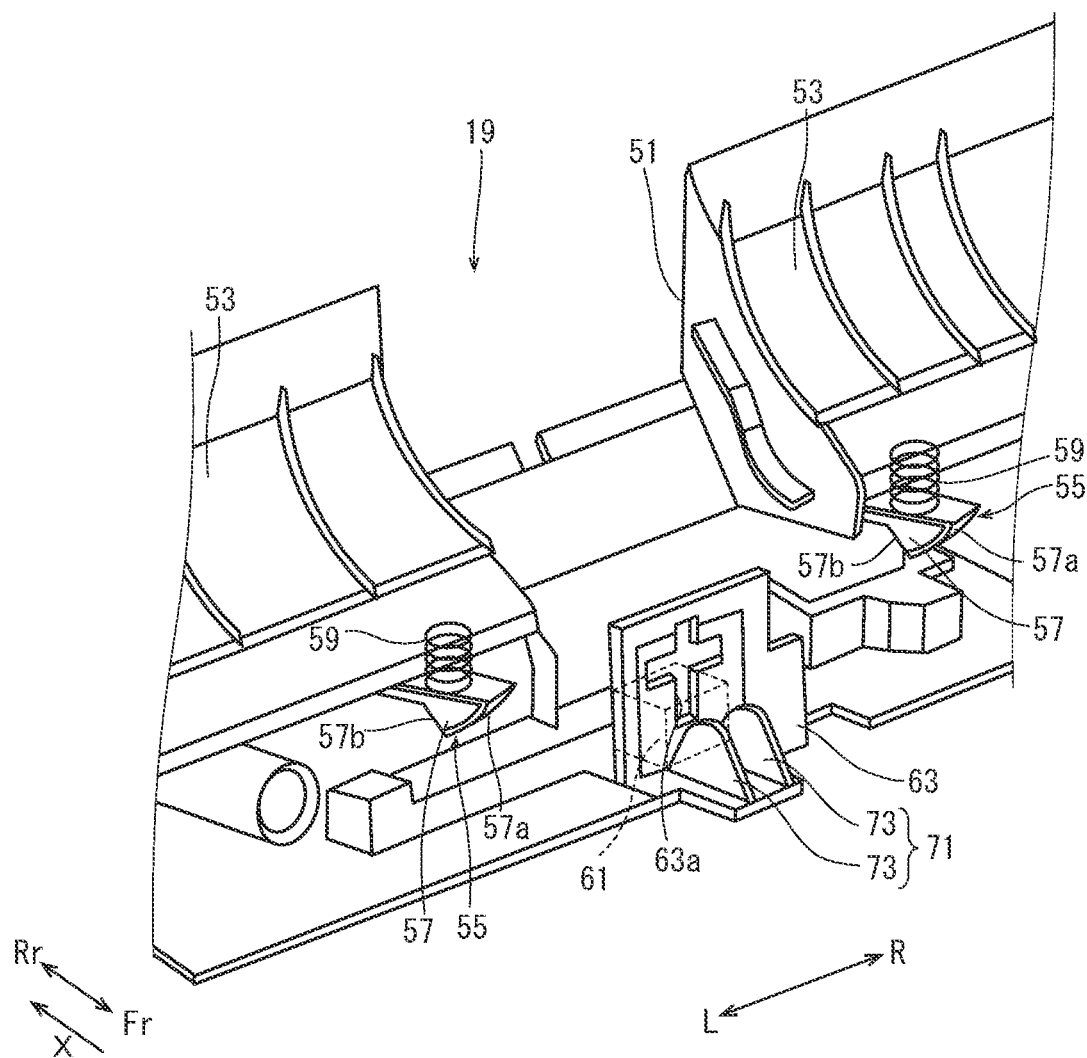
FIG. 4 is a perspective view showing a locking mechanism on the cassette attachment part side, in the image forming apparatus according to the embodiment of the present disclosure.
Figure 5:
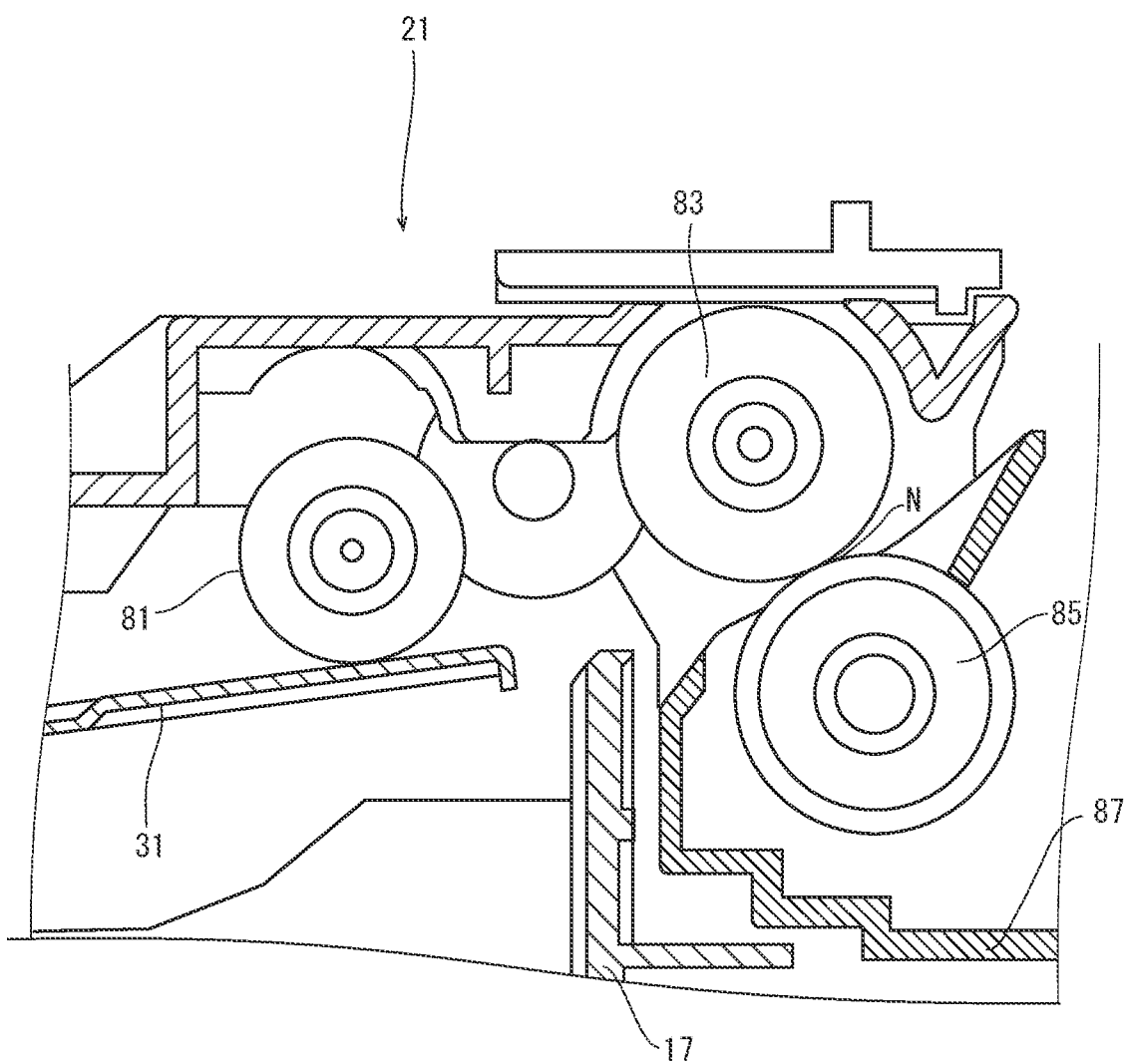
FIG. 5 is a side view showing a sheet feeding part, in the image forming apparatus according to the embodiment of the present disclosure.

Next, the sheet feeding cassette 17, the cassette housing part 19 and the sheet feeding part 21 will be described with reference to FIG. 2 to FIG. 5. FIG. 2 is a perspective view showing the sheet feeding cassette 17 and the cassette housing part 19, FIG. 3 is a perspective view showing the locking mechanism on the sheet feeding cassette side, FIG. 4 is a perspective view showing the locking mechanism on the cassette housing part side, and FIG. 5 is a side view showing the sheet feeding part 21.

The sheet feeding cassette 17 and the cassette housing part 19 each is provided with a locking mechanism which locks the sheet feeding cassette 17 in the cassette housing part 19 when the sheet feeding cassette 17 is correctly attached to the cassette attachment part 19. Furthermore, the cassette attachment part 19 is provided with a sensor 61 that is switched in a cassette detection state in which the sheet feeding cassette 17 is attached and a cassette non-detection state in which the sheet feeding cassette is not attached.

First, the sheet feeding cassette 17 will be described. The sheet feeding cassette 17 is formed in a shallow box shape with the upper surface opened, as shown in FIG. 2. The sheet feeding cassette 17 includes a sheet placement plate 31 and a lift plate 32 (see FIG. 1, not shown in FIG. 2). The sheet placement plate 31 is arranged on the bottom plate of the sheet feeding cassette 17, and is turnable upward to the downstream side in the attachment direction X (the rear side). The lift plate 32 is arranged between the sheet placement plate 31 and the bottom plate, and is turnable upward and downward around the rotating shaft. By the upward turning of the lift plate 32, the sheet placement plate 31 is inclined upward to the downstream side in the attachment direction X.

Figure 3:
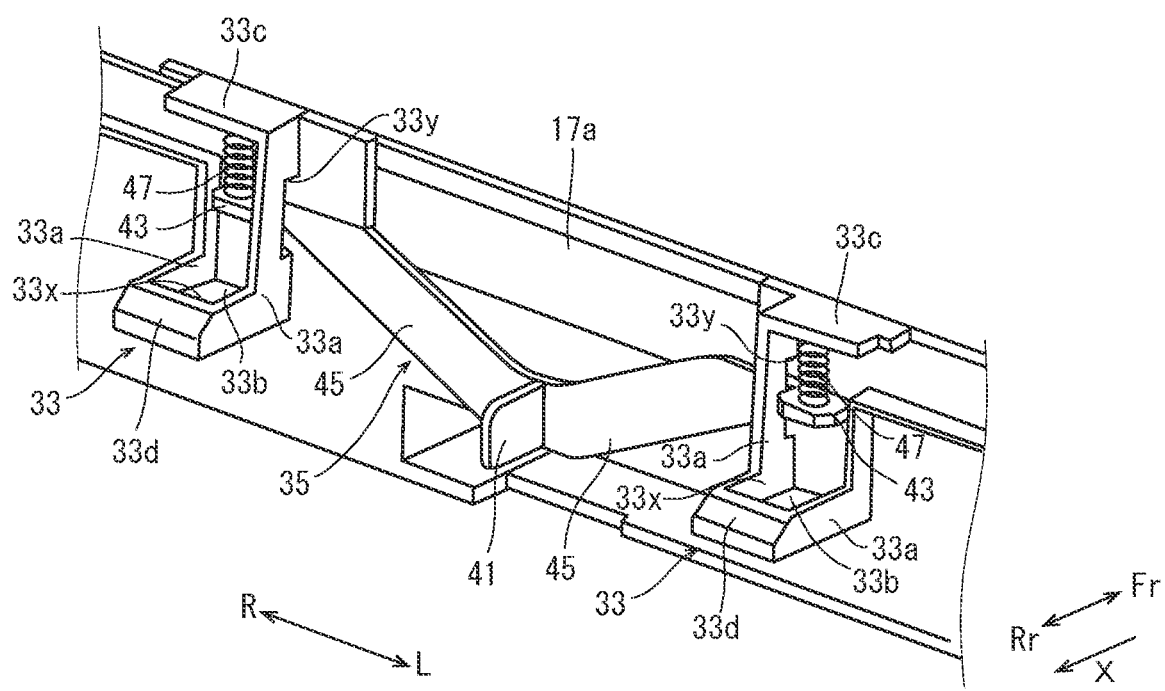
FIG. 3 is a perspective view showing a locking mechanism on the sheet feeding cassette side, in the image forming apparatus according to the embodiment of the present disclosure.

As shown in FIG. 3, the locking mechanism on the sheet feeding cassette side includes a pair of lock receiving parts 33 and a link member 35 supported by the pair of lock receiving parts 33. The locking mechanism is provided on the downstream side plate 17a (the rear side plate) of the sheet feeding cassette 17 in the attachment direction X.

The lock receiving parts 33 are provided on the outer surface of the rear side plate 17a with a predetermined space with respect to the center in the width direction (the left-and-right direction) intersecting the attachment direction X. The lock receiving part 33 protrudes to the downstream side in the attachment direction X (the rear side, the side of the cassette attachment part 19). The lock receiving part 33 has a pair of side plates 33a facing in the width direction, a bottom plate 33b, an upper plate 33c, and a rear plate 33d, and forms a recess 33x surrounded by these plates.

Each of the side plates 33a has an L-shape when viewed in the front-and-rear direction, and has a vertical portion along the upper-and-lower direction and a protruding portion protruding from the lower end of the vertical part. A slit 33y of a predetermined length along the upper-and-lower direction is formed in the vertical portion of the inner side plate 33a of the lock receiving part 33. The rear plate 33d is inclined downward to the downstream side in the attachment direction X.

The link member 35 is a V-shaped member, viewed in the front-and-rear direction, and has a detected piece 41, a pair of presser pieces 43, and a pair of arm pieces 45 provided between the detected piece 41 and the presser pieces 43. The detected piece 41 is a rectangular plate-like portion having a thickness along the width direction and extending in the upper-and-lower direction and in the attachment direction X. Each presser piece 43 is a rectangular plate-like portion having a thickness along the upper-and-lower direction and extending in the width direction and in the attachment direction X. The arm pieces 45 extend obliquely upward opposite to each other from the downstream side edges (the front edges) of the detected piece 41, and are plate-like portions having a thickness along the attachment direction X and extending in the width direction and in the upper-and-lower direction. The presser piece 43 is provided at the tip of each arm piece 45 so as to protrude in the attachment direction X.

The link member 35 is supported on the rear plate 17a so as to be movable in the upper-and-lower direction in a posture in which the detected piece 41 and the presser pieces 43 face the downstream side of the attachment direction X (the rear side) and the detected piece 41 is centered in the width direction. Specifically, the arm pieces 45 pass through the slits 33y formed in the side plates 33a of the lock receiving parts 33, and the presser pieces 43 are housed in a recesses 33x of the lock receiving parts 33. When the arm pieces 45 are guided in the upper-and-lower direction along the slits 33y, the detected piece 41 and the presser pieces 43 are moved in the upper-and-lower direction. The presser pieces 43 are moved between both the side plates 33a of the lock receiving parts 33.

A coil spring 47 is arranged between the upper plate 33c of the lock receiving part 33 and the presser piece 43. The coil spring 47 biases the presser piece 43 downward against the upper plate 33c. That is, the coil spring 47 biases the link member 35 downward until the arm piece 45 abuts the lower end of the slit 33y.

Next, the cassette attachment part 19 will be described. The cassette attachment part 19 is provided at the downstream end of the cassette housing part 15 in the attachment direction X (the rear end). As shown in FIG. 2, a recess 51 is formed in the center portion of the cassette attachment part 19 in the width direction to accommodate a separation roller 85 (see FIG. 5) supported by a holder 87. On both sides of the recess 51, guide parts 53 are formed to guide the sheet to the main conveyance path 9.

As shown in FIG. 4, the locking mechanism on the cassette attachment part side includes a pair of locking members 55 corresponding to the pair of lock receiving parts 33 of the locking mechanism on the sheet feeding cassette side. The locking member 55 protrudes to the upstream side in the attachment direction X (the front side) and is supported so as to be turnable in the upper-and-lower direction. A downward protruding locking protrusion 57 is provided at the tip of the locking member 55. The locking protrusion 57 has a triangular shape, when viewed from in the left-and-right direction, and has an inclined front surface 57a and an inclined rear surface 57b. The locking member 55 is biased to be turned downward by a coil spring 59.

Furthermore, the cassette attachment part 19 is provided with the sensor 61 that is switched in the cassette detection state in which the sheet feeding cassette 17 is attached and the cassette non-detection state in which the sheet feeding cassette is not attached, as described above. The sensor 61 is supported by a sensor holder 63, and is positioned in the center portion in the width direction, below the pair of locking members 55. The sensor 61 is, for example, a light sensor having a light emitting part and a light receiving part. The light emitting part and the light receiving part are arranged with a predetermined interval in the width direction. When an optical path P is formed between the light emitting part and the light receiving part, the sensor is switched to the cassette non-detection state in which the sheet feeding cassette 17 is not attached, and when the optical path P is blocked, the sensor 61 is switched to the cassette detection state in which the sheet feeding cassette 17 is attached. Thus, the optical path P shows a detection position of the sensor 61 in the present disclosure.

The sensor holder 63 has a bottom plate on which the sensor 61 is mounted and a front plate provided on the upstream side of the sensor 61 in the attachment direction X (the front side). A cross-shaped slit 63a is formed in the front plate. The slit 63a is aligned with the optical path P of the sensor 61 along the attachment direction X.

In front of the sensor 61 (the front plate of the sensor holder 63) (on the upstream side in the attachment direction X), a rib 71 is formed. The rib 71 has a pair of rib pieces 73 arranged at a predetermined interval in the width direction. Each rib piece 73 has a trapezoidal shape, when viewed in the left-and-right direction, and has an upper edge 73a and front and rear edges 73b, 73c. The corners between the upper edge 73a and the front and rear edges 73b, 73c are rounded. The space between the rib pieces 73 and the optical path P of the sensor 61 are aligned along the attachment direction X.

Next, the sheet feeding part 21 will be described with reference to FIG. 5. The sheet feeding part 21 includes a pickup roller 81 arranged above the cassette housing part 19 and a sheet feeding roller 83 arranged on the downstream side of the pickup roller 81 in the attachment direction X. The sheet feeding roller 83 is in contact with the separation roller 85 supported in the recess 51 of the cassette attachment part 19 to form a separation nip N between the two rollers.

The attachment operation of the sheet feeding cassette 17 to the cassette attachment part 19 and the sheet feeding operation from the sheet feeding cassette 17 in the image forming apparatus 1 having the above configuration will be described with reference to FIG. 6A to FIG. 10B. FIG. 6A to FIG. 10A are side views showing the link member 35 and the sensor 61, and FIG. 6B to FIG. 10B are side views showing the lock receiving part 33 and the locking member 55. As described above, the sheet feeding cassette 17 is inserted into the cassette housing part 15 along the attachment direction X through the opening of the apparatus main body 2.

Figure 6A:
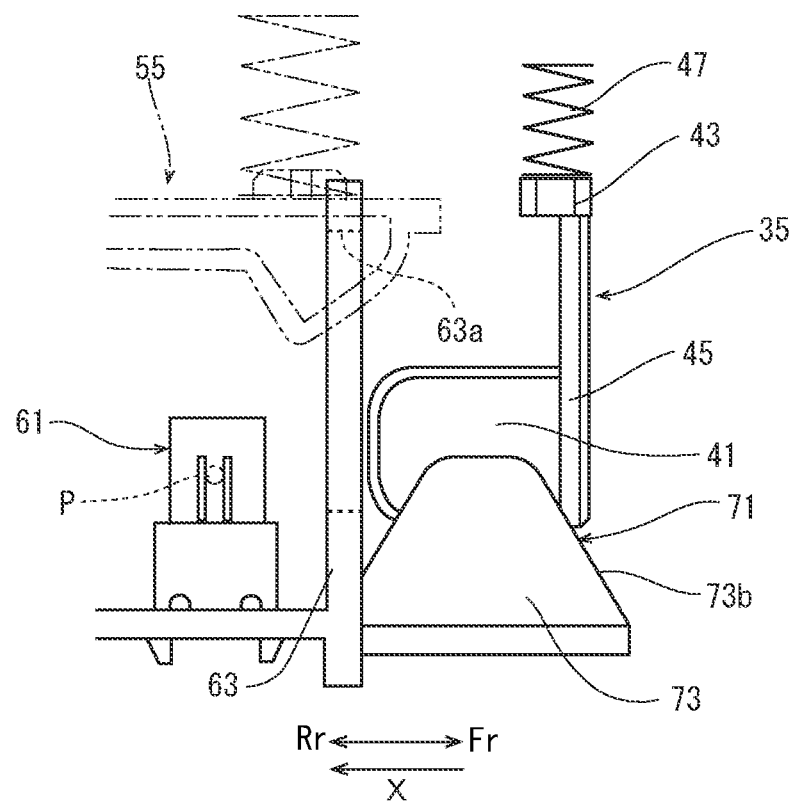
FIG. 6A is a side view showing a link member and a sensor when the sheet feeding cassette is attached (a first stage), in the image forming apparatus according to the embodiment of the present disclosure.
Figure 6B:
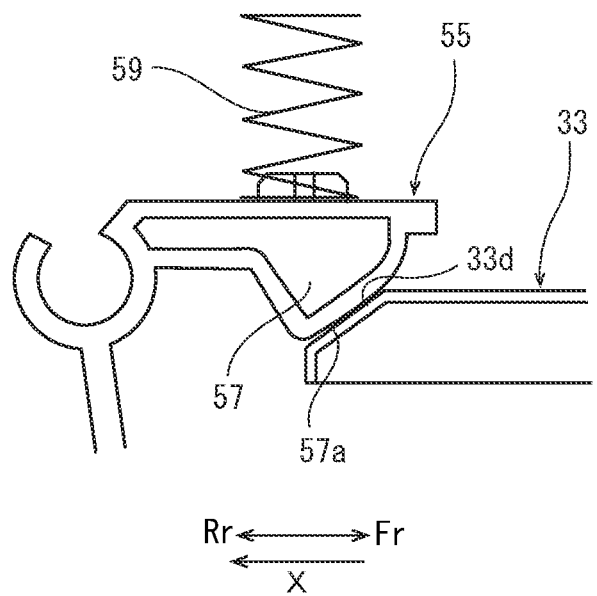
FIG. 6B is a side view showing a lock receiving part and a locking member when the sheet feeding cassette is attached (the first stage), in the image forming apparatus according to the embodiment of the present disclosure.

When the sheet feeding cassette 17 gets close to the cassette attachment part 19 (the first stage), as shown in FIG. 6A, the detected piece 41 of the link member 35 first enters between the rib pieces 73 of the rib 71, and then the arm pieces 45 of the link member 35 abuts on the front edges 73b of the rib pieces 73 of the rib 71. At the same time, as shown in FIG. 6B, the rear plates 33d of the lock receiving parts 33 abuts against the front surfaces 57a of the protrusions 57 of the locking members 55.

Figure 7A:
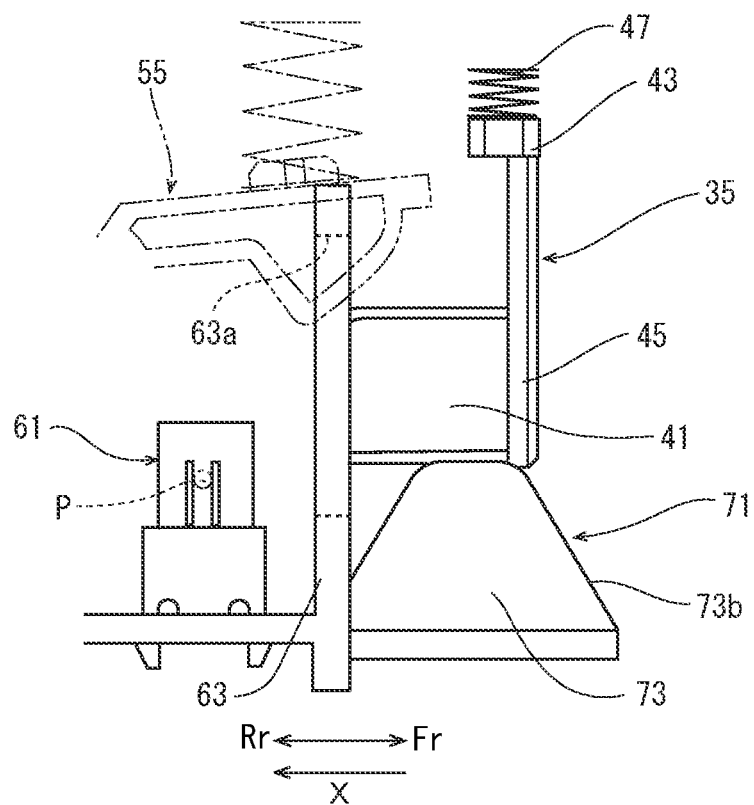
FIG. 7A is a side view showing the link member and the sensor when the sheet feeding cassette is attached (a second stage), in the image forming apparatus according to the embodiment of the present disclosure.
Figure 7B:
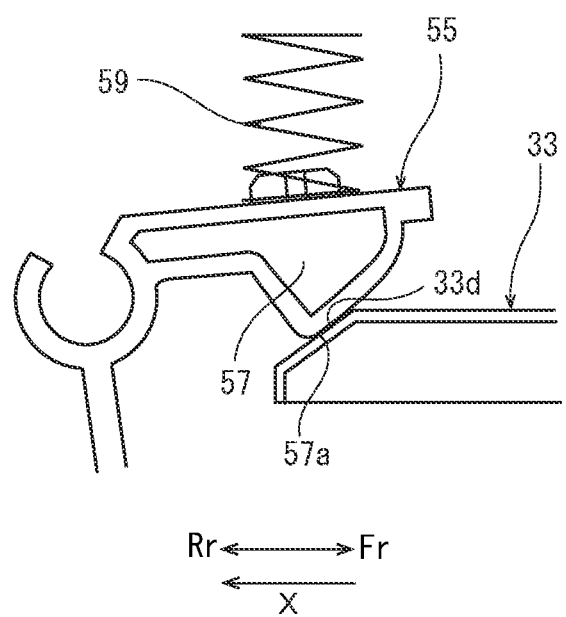
FIG. 7B is a side view showing the lock receiving part and the locking member when the sheet feeding cassette is attached (the second stage), in the image forming apparatus according to the embodiment of the present disclosure.

As the sheet feeding cassette 17 gets closer to the cassette attachment part portion 19 (the second stage), as shown in FIG. 7A, the arm pieces 45 rise along the front edges 73b of the rib pieces 73 and the link member 35 rises. The detected piece 41 enters the slit 63a of the front plate of the holder 63 from between the rib pieces 73 while rising. At this time, the presser pieces 43 move upward between the side plates 33a of the lock receiving parts 33 against the biasing force of the coil springs 47. At the same time, as shown in FIG. 7B, the rear plates 33d of the lock receiving parts 33 moves along the front surfaces 57a of the protrusions 57 of the locking members 55, and the locking members 55 begins to turn upward against the biasing force of the coil springs 59. Here, as shown in FIG. 7A, the presser pieces 43 rise above the uppermost portion of the locking members 55.

Figure 8A:
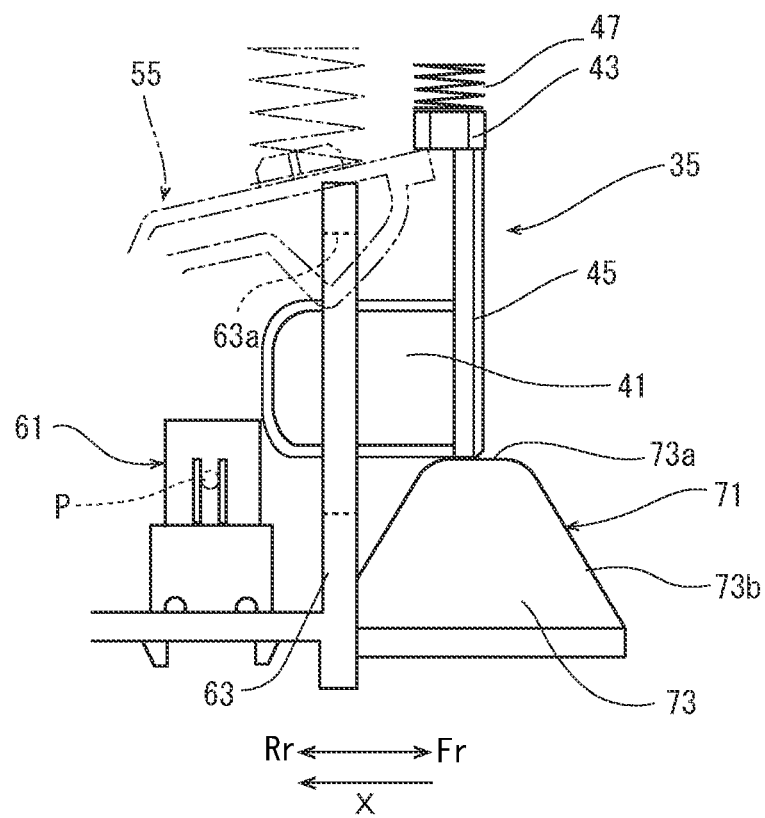
FIG. 8A is a side view showing the link member and the sensor when the sheet feeding cassette is attached (a third stage), in the image forming apparatus according to the embodiment of the present disclosure.
Figure 8B:
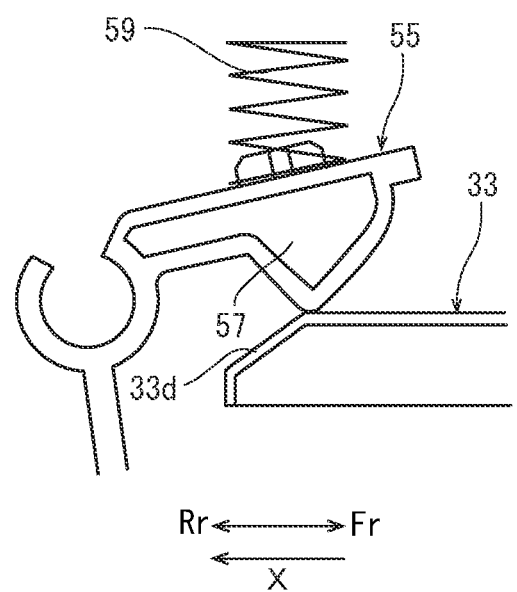
FIG. 8B is a side view showing the lock receiving part and the locking member when the sheet feeding cassette is attached (the third stage), in the image forming apparatus according to the embodiment of the present disclosure.

As the sheet feeding cassette 17 gets closer to the cassette attachment part portion 19 (the third stage), as shown in FIG. 8A, the arm pieces 45 move from the front edges 73b of the rib pieces 73 to the upper edges 73a and then move along the upper edges 71a. That is, the link member 35 moves along the attachment direction X while being risen. The detected piece 41 further enters the slit 63a of the front plate of the holder 63. At the same time, as shown in FIG. 8 B, the rear plates 33d of the lock receiving part 33 reaches the lower end of the protrusions 57 of the locking members 55, and the locking members 55 is turned to the uppermost. Here, as shown in FIG. 8A, the presser pieces 43 abut on the uppermost portions of the locking members 55 from above.

Figure 9A:
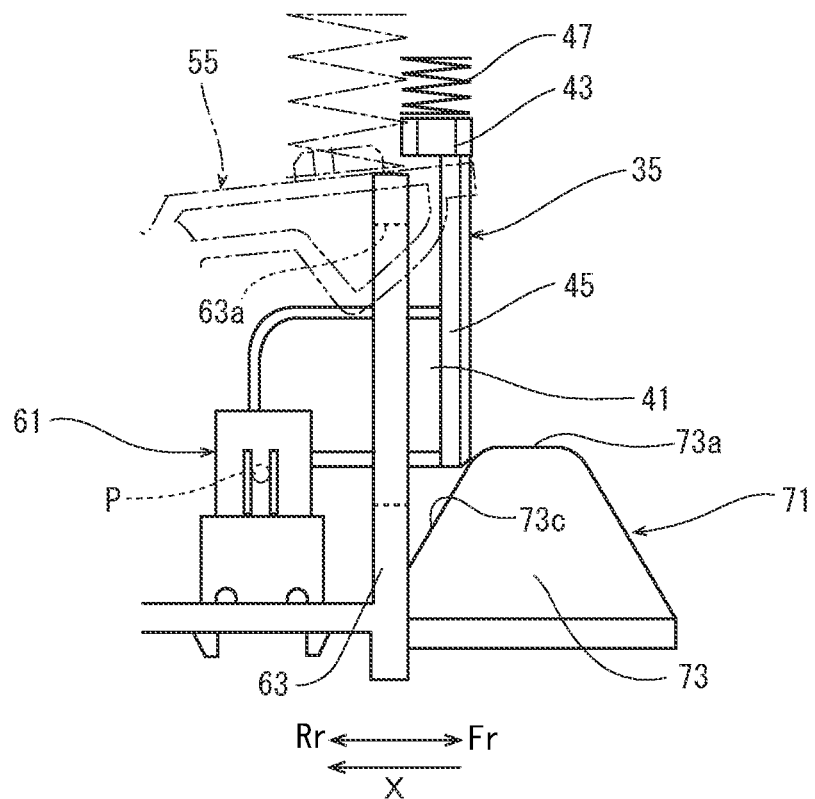
FIG. 9A is a side view showing the link member and the sensor when the sheet feeding cassette is attached (a fourth stage), in the image forming apparatus according to the embodiment of the present disclosure.
Figure 9B:
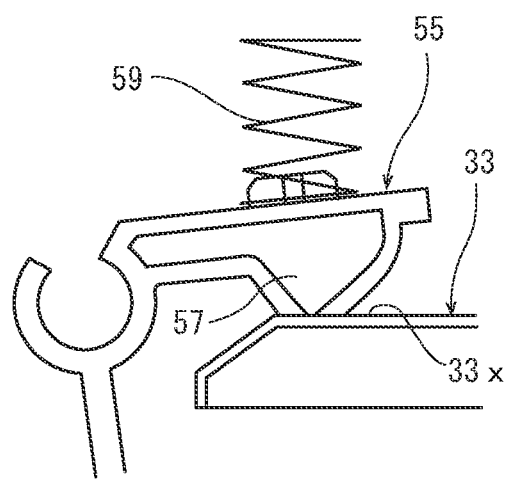
FIG. 9B is a side view showing the lock receiving part and the locking member when the sheet feeding cassette is attached (the fourth stage), in the image forming apparatus according to the embodiment of the present disclosure.

As the sheet feeding cassette 17 gets closer to the cassette attachment part 19 (the fourth stage), as shown in FIG. 9A, the arm pieces 45 move from the upper edges 73a of the rib pieces 73 to the rear edges 73c and then move along the rear edges 73c. That is, the link member 35 begins to descend due to its own weight and the biasing force of the coil springs 47. At this time, since the arm pieces 45 descend while being pressed against the rear edges 73c, the link member 35 stably descends. The detected piece 41 begins to enter between the light emitting part and the light receiving part of the sensor 61 through the slit 63a of the front plate of the holder 63. At the same time, as shown in FIG. 9B, the rear plates 33d of the lock receiving parts 33 exceeds the lower end of the protrusions 57 of the lock members 55. With this, the protrusions 57 of the lock members 55 begins to enter the recesses 33x of the lock receiving parts 33. That is, the locking members 55 begins to turn downward. Here, the presser pieces 43, while abutting on the uppermost portions of the lock members 55, descend together with the detected piece 41 that has begun to descend.

Figure 10A:
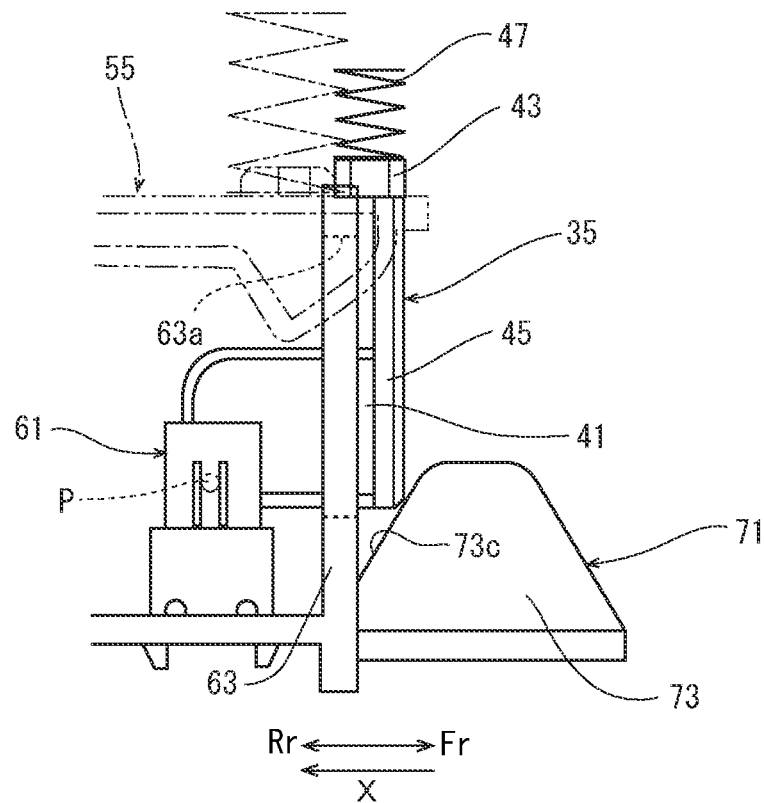
FIG. 10A is a side view showing the link member and the sensor when the sheet feeding cassette is attached (a fifth stage), in the image forming apparatus according to the embodiment of the present disclosure.
Figure 10B:
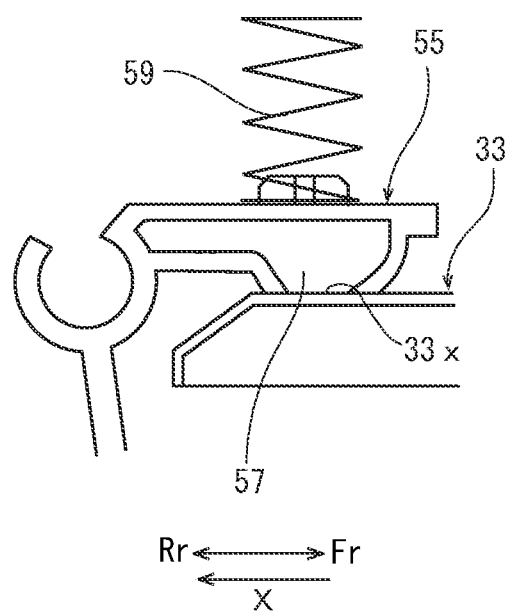
FIG. 10B is a side view showing the lock receiving part and the locking member when the sheet feeding cassette is attached (the fifth stage), in the image forming apparatus according to the embodiment of the present disclosure.

As the sheet feeding cassette 17 gets closer to the cassette attachment part 19 (the fifth stage), as shown in FIG. 10A, the arm pieces 45 move halfway to the rear edges 73c of the rib pieces 73, and the link member 35 descends further. The detected piece 41 descends between the light emitting part and the light receiving part of the sensor 61, and enters the optical path P of the sensor 61. This switches the sensor 61 from the non-cassette detection state to the cassette detection state. At the same time, as shown in FIG. 10 B, the locking members 55 are turned downward, and the protrusions 57 of the locking members 55 enter the recesses 33x of the lock receiving parts 33. That is, the lock members 55 are engaged with the lock receiving parts 33, and the sheet feeding cassette 17 is attached to the cassette attachment part 19. The presser pieces 43 are biased by the coil springs 47 and abut on the locking members 55. The descending of the link member 35 is stopped by the contact of the presser pieces 43 with the locking members 55 in this way.

When the sensor 61 is switched from the non-cassette detection state to the cassette detection state, the sheet feeding starts. That is, the pickup roller 81 of the sheet feeding part 21 rotates to feed the uppermost sheet among the sheets placed on the sheet placement plate 31 of the sheet feeding cassette 17. The fed sheet is separated at the separation nip and conveyed to the main conveyance path 9.

When the sheet feeding cassette 17 is detached from the cassette attachment part 19, the sheet feeding cassette 17 is pulled out in the direction opposite to the attachment direction X. Then, the rear plates 33d of the lock receiving parts 33 of the sheet feeding cassette moves along the rear surfaces 57b of the protrusions 57 of the locking member 55, and then the locking members 55 are turned upward. As a result, the protrusions 57 separate from the recesses 33x, and the engagement between the lock receiving parts 33 with the locking members 55 is released.

As is clear from the above description, according to the present disclosure, since the detected piece 41 for switching the sensor 61 and the presser pieces 43 for engaging the locking members 55 with the lock receiving parts 33 are integrally provided, when the sheet feeding cassette 17 is attached to the cassette attachment part 19, the detected piece 41 switches the sensor 61 from the non-cassette detection state to the cassette detection state, and at the same time, the presser pieces 43 interfere with the locking members 55 to engage the locking members 55 with the lock receiving pars 33. That is, at the same time when the sensor 61 is switched from the cassette non-detection state to the cassette detection state, the lock receiving parts 33 and the locking members 55 are engaged with each other so that the sheet feeding cassette 17 is attached to the cassette attachment part 19.

In other words, if the locking members 55 are not correctly engaged with the lock receiving parts 33, the detected piece 41 does not reach the optical path P of the sensor and the sheet feeding operation cannot be started. For example, when the locking members 55 are not fully engaged with the lock receiving parts 33 as shown in FIG. 9B, the optical path P of the sensor 61 is not blocked by the detected piece 41 as shown in FIG. 9A, the sensor 61 is thus not switched from the non-cassette sensing state to the cassette sensing state, and the start of the sheet feeding operation becomes impossible. Thus, only when the sheet feeding cassette 17 is correctly attached to the cassette attachment part 18, it becomes possible to start the sheet feeding operation.

In addition, when the sheet feeding cassette 17 is attached to the cassette attachment part 19, the locking members 55 are turned upward and then turned downward to be engaged with the lock receiving parts 33. Corresponding to the movement of the locking members 55, the presser pieces 43, that is, the link member 35 is guided by the guide rib 71 to be moved upward, moved along the attachment direction X while being moved upward, and then moved downward. Since the presser pieces 43 move above the locking members 55 in this way, when the locking members 55 are engaged with the lock receiving parts 33, the presser pieces 43 can be surely brought into contact with the locking members 55 from above.

When the link member 35 is guided along the guide rib 71, the arm pieces 45 are guided along the front edges 73b, the upper edges 73a and the rear edges 73c of the rib pieces 73. Thus, the contact area between the arm pieces 45 and the rib pieces 73 can be narrowed, and friction between them is reduced. Therefore, the link member 35 can be stably guided.

Furthermore, when the link member 35 is guided along the guide rib 71, the arm pieces 45 of the link member 35 are moved in the upper-and-lower direction along the slits 33y of the lock receiving parts 33. Since the arm pieces 45 each has a thickness along the attachment direction X and is formed in a plate-like shape extending in the width direction and in the upper-and-lower direction, it is stably guided in the upper-and-lower direction along the slit 33y. Thus, the link member 35 can be stably moved in the upper-and-lower direction without falling in the attachment direction X and the opposite direction.

Furthermore, the above description of the preferred embodiment of the present disclosure describes the preferred embodiment of the image forming apparatus and the sheet feeding cassette according to the present disclosure, so that various technically favorable limitations may be attached, but the technical scope of the present disclosure is not limited to these aspects unless otherwise stated.

The invention claimed is:

1. An image forming apparatus comprising:
a sheet feeding cassette in which a sheet is housed;
a cassette attachment part to which the sheet feeding cassette is attached; and
a sensor which is provided in the cassette attachment part and switched in a cassette detection state in which the sheet feeding cassette is attached to the cassette attachment part and a cassette non-detection state in which the sheet feeding cassette is not attached to the cassette attachment part, wherein
the sheet feeding cassette includes:
a detected piece which switches the sensor to the cassette detection state and to the cassette non-detection state;
a presser piece provided integrally with the detected piece; and
a lock receiving part by which the presser piece is movably supported,
the cassette attachment part includes a locking member which is turnably supported and is engaged with the lock receiving part when the sheet feeding cassette is attached to the attachment part, and
when the sheet feeding cassette is attached to the attachment part, the detected piece switches the sensor from the cassette non-detection state to the detection state to enable a sheet feeding operation from the sheet feeding cassette, and the presser piece interferes with the locking member to cause the locking member to be engaged with the lock receiving part.

2. The image forming apparatus according to claim 1, wherein
the locking member is configured to be turned upward and then turned downward to be engaged with the lock receiving part,
the presser piece is supported by the lock receiving part movably in an upper-and-lower direction,
the cassette attachment part includes a guide rib which guides the detected piece and the presser piece in the upper-and-lower direction according to an attachment of the sheet feeding cassette to the cassette attachment part, and
when the sheet feeding cassette is attached to the attachment part, the guide rib guides the detected piece to a detection position of the sensor and brings the presser piece into contact with the locking member from above so as to guide the locking member to be engaged with the lock receiving part.

3. The image forming apparatus according to claim 2, wherein
the presser piece is provided on both sides of the detected piece in a width direction crossing an attachment direction of the sheet feeding cassette,
the detected piece has arm pieces connected to the presser pieces,
the guide rib has a pair of rib pieces arranged with an interval in the width direction, and
when the sheet feeding cassette is attached to the attachment part, the arm pieces are guided by the rib pieces.

4. The image forming apparatus according to claim 3, comprising:
a biasing member biasing the arm pieces to the rib pieces.

5. The image forming apparatus according to claim 2, wherein
the lock receiving part has a slit along which the presser piece is guided in the upper-and-lower direction.

\* \* \* \* \*